Sept. 15, 1925.

F. B. MERRILL

PERMISSIVE TRAIN CONTROL

Filed Oct. 16, 1922

INVENTOR
F. Bertrand Merrill
By
Geo. P. Kimmel
ATTORNEY

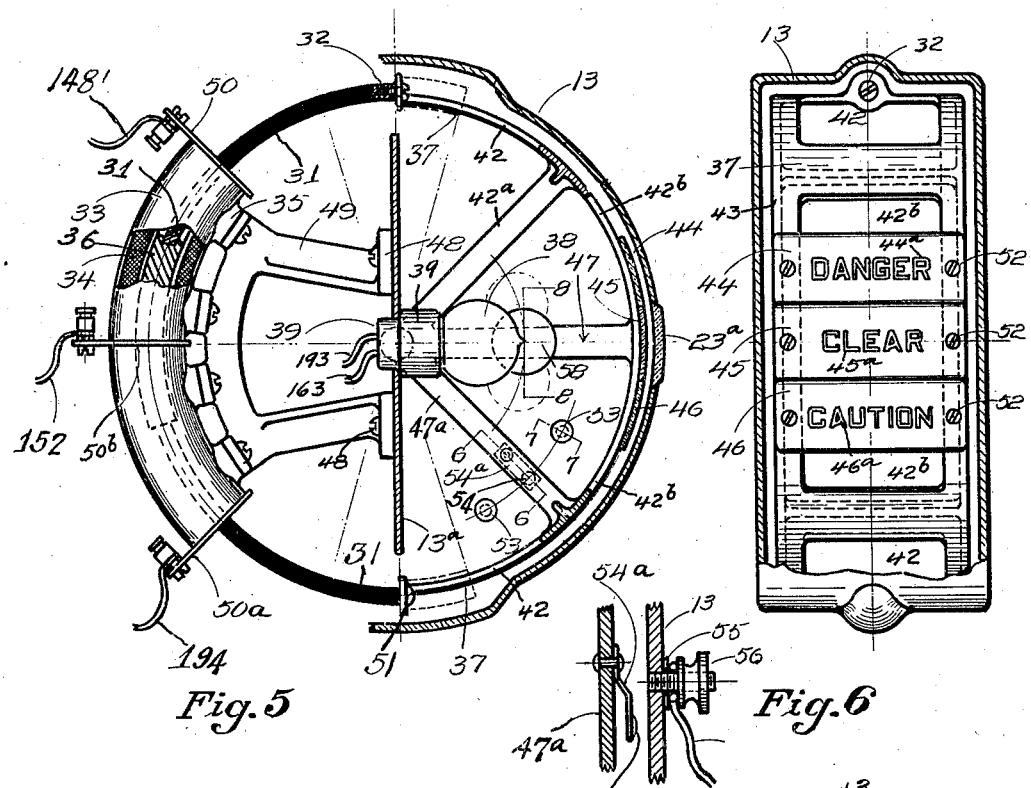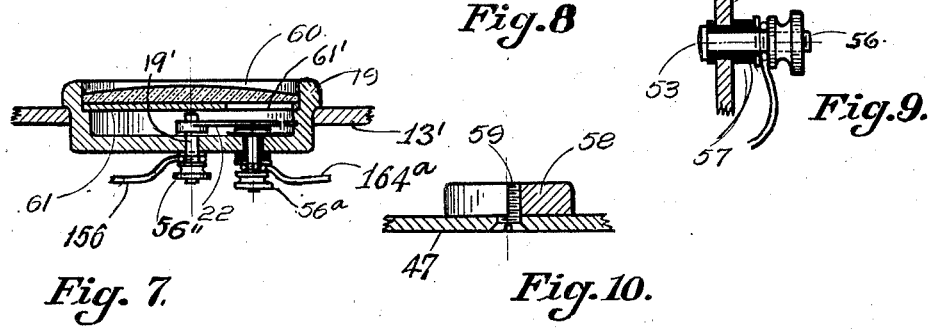

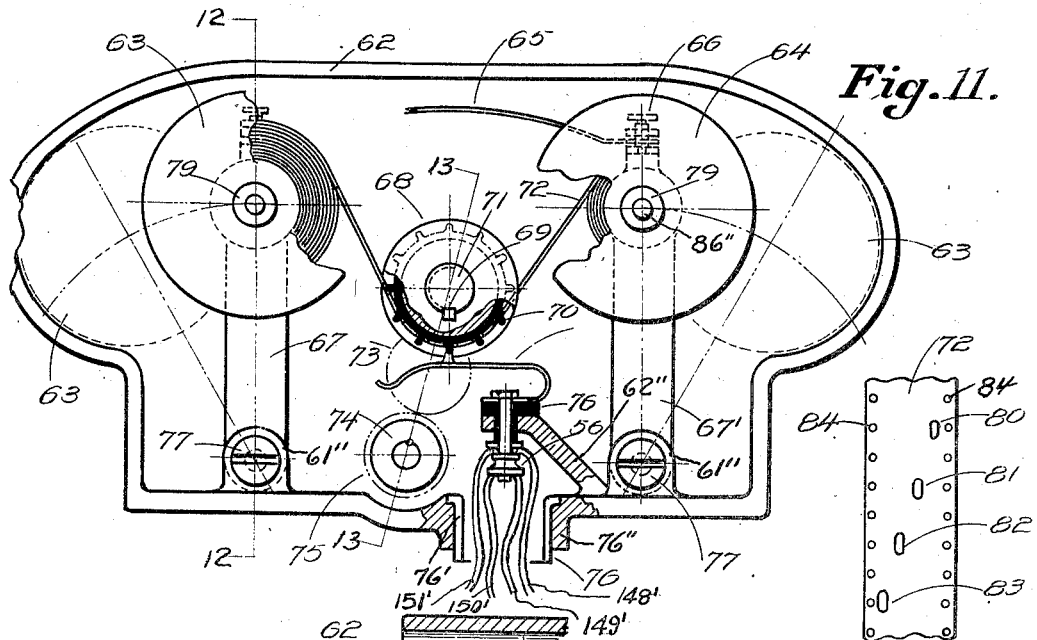
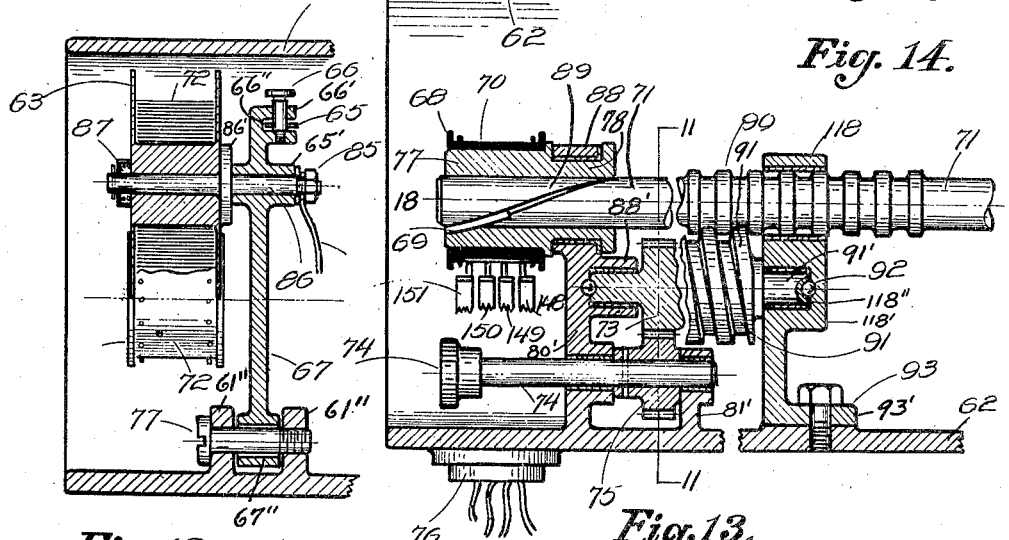

Sept. 15, 1925.            1,554,113
F. B. MERRILL
PERMISSIVE TRAIN CONTROL
Filed Oct. 16, 1922    7 Sheets-Sheet 4

F. Bertrand Merrill
INVENTOR.

BY
Geo. P. Kimmel
ATTORNEY.

Sept. 15, 1925.
F. B. MERRILL
PERMISSIVE TRAIN CONTROL
Filed Oct. 16, 1922
1,554,113
7 Sheets-Sheet 5
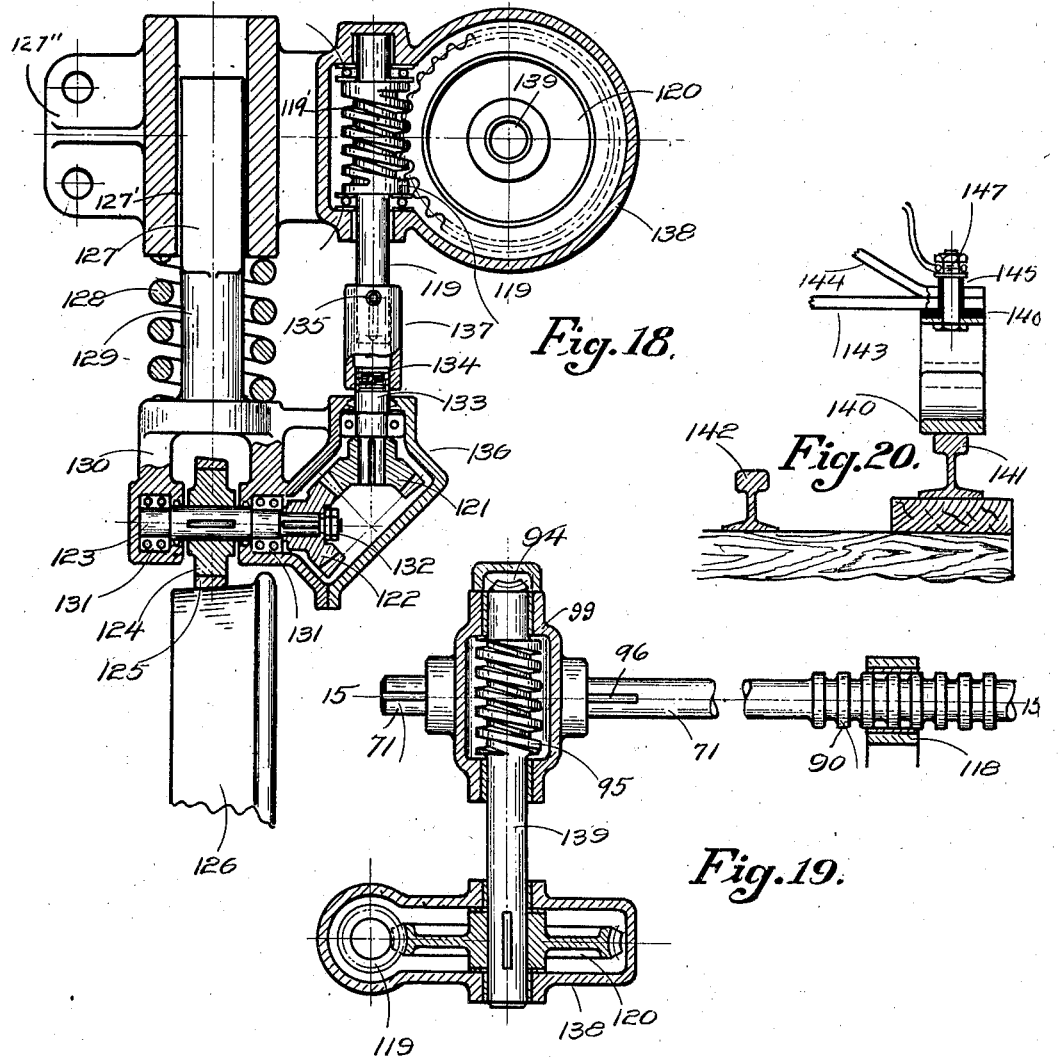
F. Bertrand Merrill
INVENTOR.
BY
Geo. F. Kimmel
ATTORNEY.

Sept. 15, 1925.  
F. B. MERRILL  
PERMISSIVE TRAIN CONTROL  
Filed Oct. 16, 1922    7 Sheets-Sheet 6

1,554,113

F. Bertrand Merrill
INVENTOR.

BY
Geo. F. Kimmel.
ATTORNEY.

Patented Sept. 15, 1925.

1,554,113

UNITED STATES PATENT OFFICE.

FLOYD B. MERRILL, OF MARQUETTE, MICHIGAN, ASSIGNOR TO THE MERRILL TRAIN CONTROL CORPORATION, OF MARQUETTE, MICHIGAN.

PERMISSIVE TRAIN CONTROL.

Application filed October 16, 1922. Serial No. 594,798.

*To all whom it may concern:*

Be it known that I, FLOYD B. MERRILL, a citizen of the United States, residing at Marquette, in the county of Marquette and State of Michigan, have invented certain new and useful Improvements in Permissive Train Controls, of which the following is a specification.

This invention relates to a controlling system for trains, and has for its object to provide a system of such class, in a manner as hereinafter referred to, with means located in the engine cab to give the engineer information as to the signals for controlling the operation of the train and with such information at all times assured to cause a safe operation of the train, whereby the preservation of human life is assured, as well as the preservation of property, and further as a system providing for a safe operation of the train which naturally follows a rapid movement of traffic.

Further objects of the invention are to provide a train control system which is comparatively simple in its construction and arrangement, strong, durable, thoroughly efficient and convenient in its use, and comparatively inexpensive to set up.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations, and modifications can be resorted to which come within the scope of the claims hereunto appended.

In the drawings wherein like reference characters denote corresponding parts throughout the several views:—

Figure 5 is a cross section taken on line 2—2 of Figure 1.

Figure 6 is an end view, partly in section, illustrating the signals.

Figure 7 is a cross section on line 3—3 of Figure 1.

Figure 8 is a section on line 6—6 of Figure 5.

Figure 9 is a section on line 7—7 of Figure 5.

Figure 10 is a section on line 8—8, Figure 5.

Figure 11 is a front view, partly in section, of the tape driving mechanism.

Figure 12 is a section on line 12—12 of Figure 11.

Figure 13 is a section on line 13—13, Figure 11.

Figure 14 is a fragmentary view of the tape.

Figure 18 is a sectional elevation of the tape sprocket driving mechanism operated from the pony truck wheel of the locomotive, or engine.

Figure 19 is a fargmentary view in section illustrating the worm wheel drive.

Figure 20 is a fragmentary view, in section, illustrating the contact or impulse rail and contact shoe.

Figure 1:
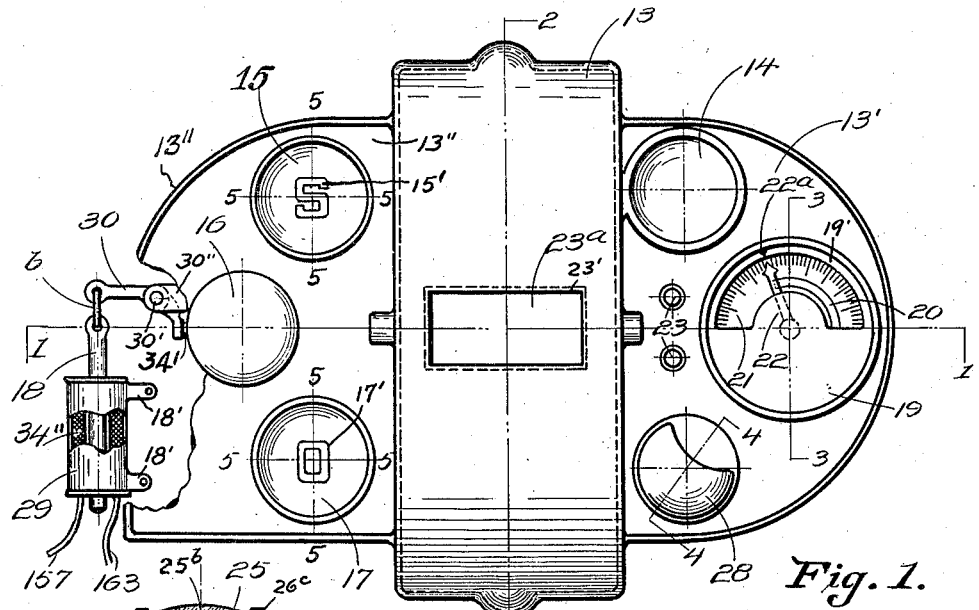
Figure 1 is a top plan view of a combined signalling and indicating mechanism adapted to be placed in the cab of a locomotive or engine.

The train control system includes what may be termed a combined signalling and indicating mechanism which is located in the engine cab and comprises a semi-circular housing 13, formed of a front and a pair of side walls and which is open at its rear. Integral with the rear end of the side walls of the housing 13, are laterally extending supporting plates 13′, 13″. The front of the housing 13, centrally thereof, has a slot 23′ in which is seated a transparent panel 23ª so that the signals can be viewed or ascertained by the engineer.

Supported by the plate 13′ is a speed control light 14, and carried by the plate 13″ is a switch signal light 15. The plate 13″ carries a signal whistle 16, which is controlled by a solenoid 34″, arranged within the casing 29. Associated with the signal whistle 16 is a steam supply pipe 16′ which carries a valve casing 16″, having the signal whistle 16 communicating therewith. The whistle 16 and the casing 16″ are secured to the plate 13″, as at 29′. Within the valve casing 16″ is arranged a valve, not shown, which is provided with a stem 34′, actuated by a bell crank lever 30, which is pivotally connected, as at 30′, to a support 30″ and said support is connected in any suitable manner to the plate 13″. The bell crank lever 30, is connected through the medium of a link b to the upper end of the core 18 of the solenoid 34″. The circuit wires for the solenoid 34″ are indicated at 157 and 163. The casing 29 is provided with arms 18′ through which are adapted to extend hold-fast devices, not shown, for the purpose of fixedly securing the casing 29 in proximity to the plate 13″.

Carried by the plate 13″, is an open switch signal light 17. The switch signal light 15, as well as the switch signal light 17 has suitable circuit wire connections and said light 15 has its lens suitably designated, as at 15′ to indicate that the light is the switch signal light, and the lens of the open switch signal light is suitably designated, as at 17′ to indicate the light 17 is the open switch signal light.

Carried by the plate 13′, is a speed indicator and which consists of a casing 19, a contact strip 20, graduations 21, a pointer 22 and means to suitably designate the speed limit point as at 22ª. The cover plate 61 of the casing 19, is slotted as at 61′, so that the graduations 21 and pointer 22 will be visible to the engineer. The indicator operates on the ammeter principle, only the graduations are for miles and not amperes, and is operated by a small generator G see Figure 22 and which is geared to a pony truck axle. Circuit wires 168, 169 lead from the generator G to the speed indicator. The shaft of the pointer 22 is indicated at 19′ and extends below the casing 19 and is provided with a terminal 56″, having a circuit wire 156 connected therewith. Extending into the casing 19 and cooperating with the contact 20 is a terminal 56ª, having a circuit wire 164ª connected therewith. Mounted on the cover 61, is a lens 60. Associated with the indicator, is an illuminating means therefor, and which comprises a light bulb 25 connected with the socket 27, which is secured to the plate 13′. Leading-in wires 27′ are connected to the socket 27. Secured to the plate 13′ and extending over the bulb 25, is a reflector 28 for directing the light towards the indicator. Secured to the plate 13′, is a push button switch 23, for the speed indicator light.

Figures 2, 3, 4:
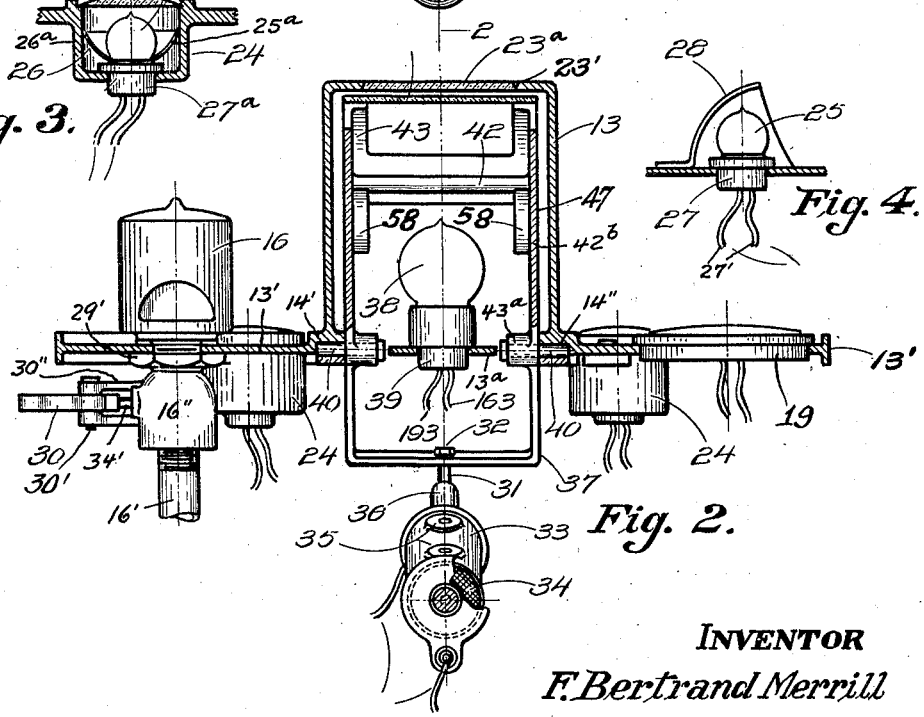
Figure 2 is a section on line 1—1 of Figure 1.
Figure 3 is a cross section of the signal light taken on line 5—5 of Figure 1.
Figure 4 is a cross section of the indicator light, taken on the line 4—4 of Figure 1.
Figure 15:
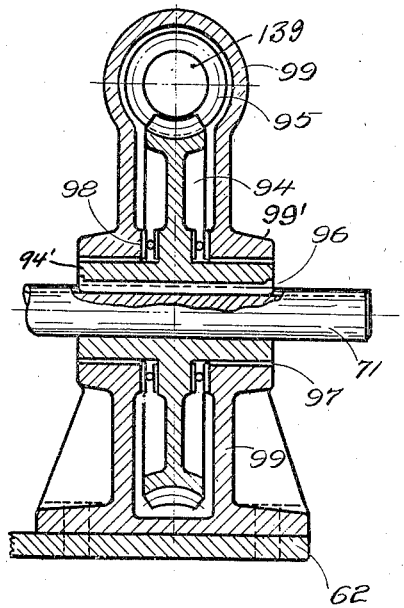
Figure 15 is a cross sectional view showing the worm wheel and its housing.
Figure 22:
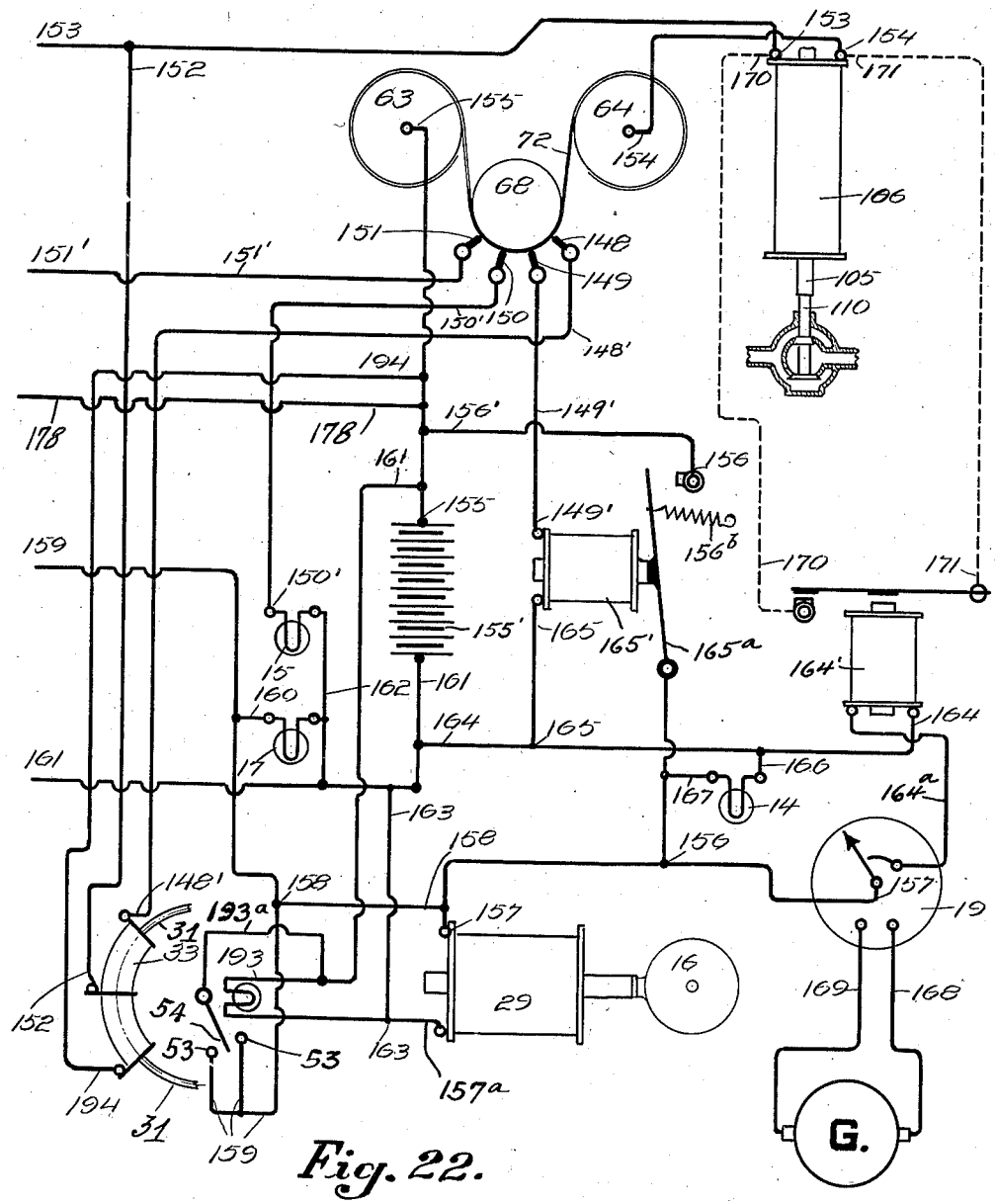
Figure 22 is a diagrammatic view of the circuit forming connections.

The speed control signal light 14, the switch signal light 15 and open switch signal light 17, each consists of a socket 27ª, circuit wires, a light bulb 25, a reflector 25ª and a lens 25ᵇ. The bulb 25 and reflector 25ª are arranged within a socket 26, formed by a depending portion 26ª integral with either the plate 13′ or the plate 13″. The socket 27ª is secured to the bottom of the depending extension 26ª. The lens 25ᵇ is arranged at the upper end of the socket 26 and inclosed by a rib 26ᶜ. The manner of setting up the lights 14, 15 and 17 is clearly shown in Figure 3. The circuit wires for the lights 14, 15 and 17, see Figure 22, are indicated at 166, 167 for the light 14, at 150′, 162 for the light 15, and at 160, 162 for the light 17.

Each of the side walls of the housing 13, centrally of the inner end thereof, is provided with a socket forming member 14′, and the socket in each of said members is indicated at 14″. The members 14′ 14′ provide bearings for stub shafts 40, carried by an intermittently rotatable signal supporting wheel 43 having tubular extensions 43ª in which are connected the stub shafts 40. The wheel 43 consists of a half rim 37 provided with elongated slots 42, 42ᵇ. Spokes 42ª 47 and 47ª are connected to each side of the rim 37 and to each of the members 43ª. Secured to the rim 37 and extending across the slot 42ᵇ, are signal elements 44, 45 and 46, and each of which is detachably secured in position by the hold-fast devices 52. The signal element 44 is provided with a suitable indication, as at 44ª to indicate "danger". The signaling element 45 is provided with a suitable inscription, as at 45ª, to indicate "clear", and the signaling element 46 is provided with a suitable inscription, as at 46ª, to indicate "caution". The signaling elements are arranged in abutting engagement and each of which is adapted to be visible through the panel 23ª, as shown in Figure 5.

The signal carrying wheel is electrically shifted for the purpose of positioning the signaling elements for exposure through the transparent panel 23ª, and to provide for the shifting of the signal carrying wheel there is connected with the ends of the half rim 37, in a manner to be presently referred to, an arcuate shaped core 36, of a curved solenoid 34. The core 36 is of less length than the windings of the solenoid, and the said windings are arranged in a casing 33, having each end provided with a conducting plate, indicated at 50, 50ª to which the circuit forming wires, 148′, 149 respectively are electrically connected. The casing 33, intermediate its ends, is provided with a conducting plate 50ᵇ, to which a circuit wire 152 is electrically connected.

The rear end of the housing 13 has suitably arranged therein a supporting plate 13ᵃ, carrying a laterally extending supporting bracket 49, provided with lugs 35, which are attached to the casing 33.

Secured centrally of the plate 13ᵃ, is a lamp socket 39, carrying a bulb 38, and leading to the socket 39 are circuit wires 163 and 193, and said wires 163 and 193, socket 39 and bulb 38, provide an illuminating device for the signaling elements.

Each end of the half rim 37 is enlarged, as at 51, and connected to said enlargements, by the holdfast devices 32, are curved rods 31, which are secured to the ends of the core 36. The bracket 49 is connected to the plate 13ᵃ by the holdfast devices 48. Each of the spokes 47 has secured therewith, by the holdfast device 59, a weight 58 and these latter are employed to move the half rim 37 into the danger position in case that the solenoid 34 fails to function or become damaged.

In case the solenoid 34 is completely deenergized, by way of example, failure of the source of power, the weights 58 by gravity turn the signal carrying wheel so as to bring the danger signal glass 44ᵃ before the window or panel 23ᵃ, thus indicating a danger condition to exist in the control apparatus. Contacts 53 are mounted on the housing 13 and a contact 54 is fastened to a spoke 47ᵃ by a rivet and a spring strip 54. These contacts close the circuit on the signal whistle operated by the solenoid for same, whenever the signal supporting wheel moves to indicate either danger or caution, thus giving an audible signal to the engineer to attract his attention to the changes of signals on the signal board. This circuit is shown in Figure 22. The current leaves the battery at wire 161, passes to wire 193ᵃ to the contact 54 on the signal wheel, thence by either of the contacts 53 to wire 158 by wires 159, thence to the whistle operating solenoid by wire 157 and from the whistle solenoid returns to the battery by wires 157ᵃ, 163, 161, thus completing the circuit.

Associated with each contact 53, is a terminal 56 carrying a washer 57. The terminal 56 is insulated from the housing 13, as at 58.

The train control system further includes what may be termed a combined registering and circuit controlling mechanism which is arranged in cooperative relation with respect to the combined signaling and indicating mechanism and the said combined registering and circuit controlling mechanism comprises a casing 62 which is fixed in any suitable manner within the engine cab and has its bottom formed with an opening 76' and also with a collar 76" which registers with the opening 76', as well as forming a continuation thereof, and secured to the bottom of the casing 62 and extending through the collar 76" is a sleeve 70 of insulation. The upper face of the bottom of the casing 62, at each side of the opening 76', has formed integral therewith a pair of spaced apertured lugs 61" and extended between one pair of lugs 61" is a standard 67, and extending between the other pair of lugs 61" is a standard 67'. The lower end of each of said standards is formed with a collar 67" which registers with the openings formed in that pair of lugs 61" between which the collar 67" is arranged. Each of the standards is pivotally connected to a pair of lugs 61" through the medium of a pivot screw 77 which extends through the pair of lugs 61" and collar 67", and has threaded engagement with one of the lugs of the pair of lugs 61". Each of said standards, at a point removed from its upper end is formed with a bearing 65' and at its upper end with a pair of rearwardly extending spaced superposed flanges 66' and 66". The flanges 66' and 66" are apertured and extending through said flanges and further having threaded engagement with one of said flanges, is a retaining screw 66. The standard 67 opposes the standard 67', and the said standards are connected together by an arcuate shaped coupling member 65, which has each end extending between a pair of flanges 66', 66", and is connected with said flanges by the retaining screw 66, and said coupling member 65 provides means for maintaining the standards 67, 67' in vertical position.

Extending through, as well as projecting forwardly from the bearing 65', of the standard 67, is a reel supporting shaft 86, provided with a collar 86'. Mounted in the bearing 65' of the standard 67, is a reel supporting shaft 86" constructed in the same manner as the shaft 86. The inner ends of the shafts 86, 86" carry securing nuts 85. Mounted on the shaft 86, forwardly with respect to the collar 86', is a tape unwinding reel 63, and mounted on the shaft 86" forwardly with respect to its collar 86' is a tape winding reel 64. The outer end of each of the shafts 86, 86", is provided with a locking cap 87 for the purpose of holding the reel in position.

The tape which is indicated at 72, not only provides for registering distances, but also acts as a circuit opening and closing member. The tape 72 is constructed of metallic material, and is provided with suitable means for indicating distances and the combined registering and circuit controlling mechanism is so set up whereby the tape will be driven from a pony truck wheel on the locomotive so that for a given distance the locomotive travels, the tape will also travel a certain distance, by way of example, for every mile the locomotive travels the tape will travel four inches. The tape 72 winds off the reel 63 and onto the reel 64, and said tape 72 is provided near each edge throughout, with spaced openings 84. The tape 72 is provided with a caution slot 80, a speed control slot 81, a switch slot 82 and an automatic stop slot 83. The openings 84 in the tape are provided for the engagement with the tape 72 of a shifting means therefor so that on the operation of the shifting means the tape will unwind from the reel 63 and wind on the reel 64.

The bottom of the casing 62, rearwardly with respect to the opening 76', has formed integral therewith vertical webs 80', 81', the latter is of less height than and is arranged rearwardly of the former, as well as being spaced therefrom. The upper end of the web 80' is provided with a bearing 88 for the extended portion 78 of the hub 77 of a tape driving sprocket 70 and the teeth of said sprocket engage in the openings 84 for the purpose of shifting the tape 72. The hub 77 is mounted on a shaft 71 and secured therewith through the medium of a key 69. The sprocket 70 is provided with a collar 68 of insulation. The shaft 71 is extended through a bearing 118 arranged rearwardly of the web 81' and carried on the upper end of a flanged support 118'. The flange of said support is indicated at 93', is arranged at the lower end of the support 118', and is fixed to the bottom of the casing 62 by the hold-fast device 93. The support 118' is spaced from the web 81' and is of greater height than said web 81'. The support 118', below the bearing 118, is provided with a socket 118". The shaft 71 intermediate its ends, is provided with parallel grooves or teeth 90, with which engages a form 91, provided intermediate the ends of the shaft 91'. The web 80', below the bearing 88 is provided with a socket 88' which opposes the socket 118", and extending into said sockets are the ends of the shaft 91', and arranged within said sockets are globular members 92, which bear against the ends of the shaft 91' for taking the end thrust of said shaft. The shaft 71 is provided with a spiral key-way 89 for adjusting or retarding the tape 72.

Journaled in the webs 80', 81', is an adjusting handle 74, provided with a spur pinion 75, which engages with a spur gear 73 carried by the worm shaft 91'.

Supported by the bottom of the casing 62 is a housing 99, provided intermediate its ends with a bearing 99', in which is arranged bushings 97, for the hub 94' of a tape drive worm wheel 94. The hub 94' is keyed to the shaft 71, as at 96. Interposed between the worm wheel 94 and the housing 99 are thrust bearings 98. Extended through the top of the housing 99 and operated in any suitable manner, preferably from a pony truck wheel on the locomotive, as well as meshing with the worm wheel 94 for driving it, is a worm 95, carried by a shaft 139.

Associated with the worm shaft spur gear 73 for the purpose of locking the same, is an electrically controlled arresting mechanism and which comprises a pawl arm 100, provided at one end with a pawl 100' and pivoted intermediate its ends at 100". The pawl 100' engages with the gear 73, see Figure 16. The reference character 101 denotes a solenoid case which incloses a solenoid 101', provided with a core 104. The upper end of the core 104, is connected to the arm 100, by a link 103 and said arm 100 is connected with the case 101 through the medium of a pulling spring 102. Circuit wire connections 104' lead to the solenoid 101'. The system further includes an electrically controlled stop valve mechanism and which associates with the main train brake line and said mechanism includes a housing 112', provided with a pair of valve seats 114' against which abut the valve disks 114, for the purpose of closing the intake 113 from the main train brake line to the air line exhaust 113ᴬ. The housing 112' is provided with a cap 115 and also with a packing 112, and the disks 114 are carried by a valve stem 110 which extends through the gland 111. The reference character 116 denotes a solenoid which is arranged within a casing 106 provided with terminals 107. The core of the solenoid 116 is indicated at 105 and which is connected to the stem 110 by the collar 109, and mounted on the core 105 and interposed between the casing 106 and collar 109 is a coiled spring 108. The casing 106 is provided with apertured lugs 117 for securing it in position.

In Figures 18 and 19, a driving means for the shaft 139, operated from the wheel of a pony truck of the locomotive is illustrated, and said means includes a shaft 123, journaled in a frame 130 and provided with a wheel 124, having a tire 125, which engages with the pony truck wheel 126. Bearings 131 are arranged in the frame 130 for the shaft 123. Formed integral with one side of the frame 130 is a casing 136, and into which extends the shaft 123. The frame 130 is provided with a stem 129, provided with a polygonal-shaped upper portion 127, extended into a sleeve 127' forming a part of a hanger arm 127", having formed integral therewith a casing 138. Surrounding the cylindrical portion of the stem 129 and interposed between the sleeve 127' and the frame 130 is a coiled spring 128 which acts as a cushion for the frame 130.

That end of the shaft 123 which extends into the casing 136, is provided with a bevelled gear 122, meshing with a bevelled gear 121, carried on the lower end of the worm drive stub shaft 133. Lock nuts 132 are provided for connecting the bevelled gear 122 to the shaft 123. Secured to the upper end of the shaft 133, is a driving sleeve 134, which has a pin and slot connection with the lower end of a shaft 119, extended into the casing 138 and provided with a worm 119'. The shaft 139 extends into the casing 138, and is provided with a worm wheel 120 which meshes with a worm 119', and by this arrangement when the wheel 124 is driven from the pony truck wheel 126, motion will be transmitted to the shaft 71, under such conditions operating the tape drive sprocket. Carried by the locomotive, is a contact shoe support 143, provided with a bracing element as at 144. Extending through the outer end of the support 143, as well as the outer end of the brace 144, is a terminal 147, which is insulated from the support 143 and brace 144, as at 145 and 146. The terminal 147 carries a contact shoe 140, adapted to engage the contact rail 141 which is positioned at one side of a traffic rail 142.

Arranged within the casing 62, is a support 62'', carrying a terminal 56, which is insulated as at 76, from a series of resiliently supported circuit controlling pins cooperating with the tape 72, and which are indicated at 148, 149, 150 and 151. Leading from the terminals of the pin 148, 149, 150 and 151, are circuit wire connections 148', 149', 150' and 151' respectively. The pin 148 is employed for controlling the caution circuit. The pin 149 is employed for controlling the speed control circuit. The pin 150 is employed for controlling the switch controlling signal light circuit and the pin 151 is employed for controlling the stop controlling circuit and stop control relays. The circuit arrangements are shown in Figures 21 and 22.

The battery or source of electrical energy is indicated at 155'. Leading from the source 155' to the shaft 86, of the reel 63, is a conductor 155. Leading from the solenoid 116 to the shaft 86'' of the reel 64 is a conductor 154. Leading from the solenoid 116 to a contact 188 is a conductor 153. The conductor 153 is provided with a branch 153' which leads to a contact 188'. Primary and secondary stop relays are employed and the former is indicated at P and the latter at S. The stop relay P includes a spring controlled core 185, carrying a coiled spring 184, having its tension adjusted through the medium of a collar 183. The collar 183 is arranged at a point removed from the outer end of the core 185 and that part of the core which extends outwardly from the collar 183 is provided with a sleeve 182 of insulation. The outer end of the core 185 is provided with a contact collar 181, which is insulated from the core by the sleeve 182. The inner end of the core 185, is provided with an angle shaped extension 186, which carries an adjustable contact point 187, cooperating with the contact 188. The secondary stop control relay S includes a core 185' provided with a coiled spring 184', having its tension adjusted through the medium of an adjustable collar 183'. The core 185' carries a sleeve 182' of insulation and is also provided with a contact collar 193 on its outer end and which is insulated therefrom, by the sleeve 182'. The inner end of the core 185' is provided with an L-shaped extension 186' which carries an adjustable contact point 187', cooperating with a contact spring 188'.

Figure 21:
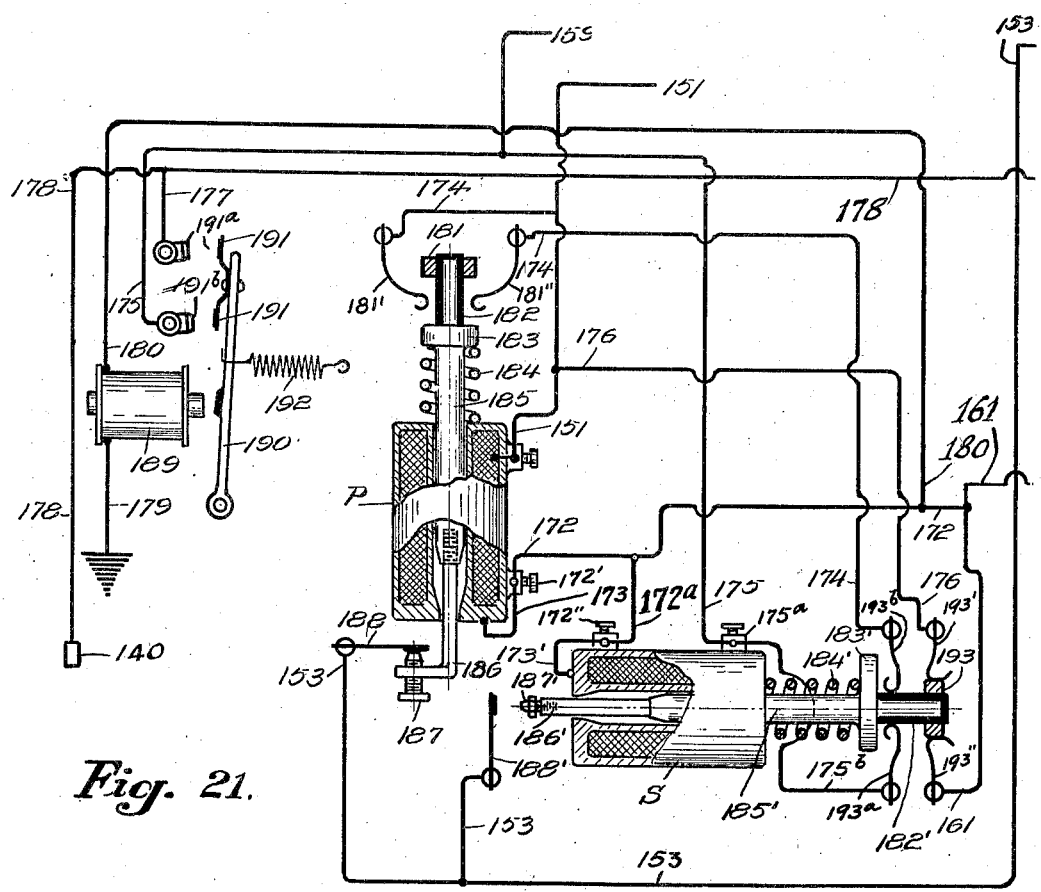
Figure 21 is a diagrammatic view illustrating the circuit to the control release.

Associated with the contact collar 181, are resilient contacts 181' and 181'', Figure 21. Cooperating with the contact collar 193 is a pair of resilient contacts 193' and 193'', and also cooperating with the contact collar 193 is a pair of resilient contacts 193$^a$ and 193$^b$. The conductor 151' leads to the relay P. Leading from the conductor 151' to the contact 193' is a conductor 176, and leading from the contact 193'' to the source 155' is a conductor 161. Leading from the conductor 161 to the relay P, is a conductor 172, attached to a terminal 172', carried by the relay P, and leading from the terminal 172' to the relay P, is a conductor 173. Leading from the conductor 172 to the relay S, is a conductor 172$^a$, which is attached to a terminal 172'', carried by the relay S and leading from the terminal 172' to the relay S is a conductor 173''. Leading from the contact 181'' to the contact 193$^b$, is a conductor 174, and leading from the conductor 151' to the contact 181' is a conductor 174'.

The reference character 189 indicates the magnet of a track impulse relay from which extends a ground conductor 179. Leading from the contact shoe 140 is a conductor 178, which is connected to the conductor 155. Leading from the magnet 189 to the conductor 172, is a conductor 180. The track impulse relay includes the armature 190 of the magnet 189 and which has a controlling spring 192 connected therewith. The armature 190 is provided with a contact member 191 for bridging a pair of contacts 191$^a$ and 191$^b$. Leading from the contact 191$^b$ to a terminal 175$^a$ on the relay S is a conductor 175, and leading from the terminal 175$^a$ to the contact 193$^a$ is a conductor 175$^b$.

The conductor 153 is connected with the solenoid 34 through the medium of a conductor 152, and the said solenoid 34 is connected with the pin 148 by the conductor 148' and with the conductor 155 by a conductor 194. Leading from the pin 150 to the switch signal light 15, is the conductor 150', and leading from said light 15 to the conductor 161 is a conductor 162, and said conductor 162 is connected with the open switch signal light 17 by a conductor 160, which is connected to the conductor 159, the latter leads to the conductor 175. Leading from the conductor 159 is a conductor 158, and which is connected to a conductor 157, the latter is connected with the solenoid 29 and also with the speed indicator 19. Leading from the solenoid 29 to the lamp 38 is a conductor 157ª connected to the conductor 163. The conductor 157 is connected by the conductor 156 with a conductor 167 which leads to the signal controlling light 14 and the latter is connected with a conductor 164 by a conductor 166. Leading from the speed indicator 19 to a relay 164', is a conductor 164ª, and the said conductor 164 also leads to the relay 164'. The conductor 164 is connected to the conductor 161 and is furthermore connected by a conductor 165 to a relay 165', having its armature indicated at 165ª and which associates with a contact 156. The armature 155ª is provided with a controlling spring 156ᵇ. The conductor 156 is connected to the armature 165ª. The conductor 149' leads from the pin 149 to the relay 165'. Leading from the contact 156 to the conductor 155 is a conductor 156'.

The wires 170 and 171 are used to produce a short circuit on the stop or brake valve magnet 106 whenever the speed control is operative. The operation is as follows: Whenever the speed control is made operative by a slot on the tape coming under the contact pin 149, the slot opens the circuit on the pin 149 and wire 149', thus de-energizing the relay magnet 165' and thereby releasing the armature 165ª, causing said armature to close the circuit from the battery to the speed control light 14 and the speed indicator 19 and the speed control relay 164', this being accomplished by wires 156', 157, 164ª and 164. As long as the speed of the train is kept below the rate at which the contact indicating arrow of the speed indicator makes contact with the stationary contact of the indicator the circuit is not closed on the speed control relay 164'. However if the speed of the train exceeds the limit the contact indicating arrow of the speed indicator 19 makes contact with the stationary contact, thus energizing the relay 164' and causing its armature to be attracted thus closing the circuit of wires 170 and 171, thereby shorting the stop valve magnet and causing it to release the stop valve and apply the brakes. This is illustrated in Figure 22.

The signalling and indicating mechanism is used to give the engineer information as to the signals to be given his train to control its movements. The mechanism must be so placed that it will be visible to the engineer at all times. The various signals are visible through the panel 23ª to provide for the control of movement of the train. The indicator 19 will set forth the speed at which the train is travelling and the light 28 is for night illumination of the indicator 19. The light 14 is to indicate to the engineer whether or not the speed control is in effect. The light 15 is to warn the engineer of the approach towards a switch. The light 17 is employed to indicate whether the switch being approached is open or not, and the audible signal 16 calls the engineer's attention to any changes of signals made on the signal board. The signal supporting wheel is operated by the solenoid 34 and the latter is normally energized thus balnacing the solenoid core 36, which normally brings the signal 45ᴅ before the panel 23ª, thus giving a normal indication of clear.

The solenoid 34 is wound differentially so that either half of it may be de-energized without de-energizing the other half, this being accomplished by the use of a common neutral line to the center terminals, as indicated at 152. When the upper half of the solenoid is de-energized, the core 36 will swing so as to center on the lower half, turning the signal supporting wheel so as to bring the signal 46ª before the window 23ª, thus setting forth an indication of caution to the engineer. When the lower half of the solenoid is de-energized, the core will switch so as to center on the upper half and this will switch the signal supporting wheel so as to bring the danger signal 44ª before the panel 43ª, thus indicating danger condition to the engineer.

In case the solenoid 34 is completely de-energized, by way of example, failure of the source of power, the weight 58 by gravity turns the signal supporting wheel so as to bring the danger signal 44ª before the panel 23ª, thus indicating a danger condition existing in the control apparatus.

The tape 72 with its means for driving same from a pony truck wheel of the locomotive or engine, is so arranged that for a given distance the locomotive travels the tape will have a given ratio of movement for this distance. The contact pins which associate with the tape, the latter being metallic, are arranged relative to the tape so that when a hole in the latter is positioned over one of the pins, a circuit will be broken.

Means is also provided so that in case the locomotive enters the siding at one end and passes out the other, the engineer can retard the travel of the said tape to account for the extra distance the train will travel in going around the siding. On this tape at different places across its width, slots will be cut to come under the proper contact pin, thus breaking at the proper places, the proper control circuit. Through this tape, from one containing reel to the other the circuit to the stop valve is completed. Thus should a break occur in the tape, it will result in the setting of the air brake. Normally all circuits from the tape are closed. These control relays are so arranged that once a circuit is broken on them only one will be reset by the circuit from the tape being reclosed. The other must be reset by receiving an impulse from the track before the circuit is restored on the other.

The contact shoe 140 is suitably located upon the engine so as to make contact with the contact rail 141, which will be placed at each location a track impulse is desired to be given the train. The operation of the impulse is as follows: The contact rails are placed along the track so as to be in position to make contact with the contact shoe located on the locomotive. These contact rails are so arranged that when the block ahead is clear an electrical circuit is completed between the contact rail and the track, so that current from the contact shoe passing through the contact rail will pass from the rail to the track; from the track to a locomotive, from the locomotive by reason of a ground wire to the proper apparatus on the train. Thus completing a given electrical control circuit, producing on the locomotive a track impulse. When the block ahead is occupied, no electrical contact will be established between the contact rail and the track. Thus current from the contact shoe on the locomotive will not pass from the contact rail to the track and thus the circuit of the impulse device will not be completed when the contact shoe makes contact with the contact rail; therefore, no track impulse will be given the train, under such condition. This connection of the track and the contact rail can be controlled by track circuit relays or by other means.

Connected in the train brake line is the electrical magnetic operated stop valve. The function of this valve is to reduce the train brake line pressure and thus apply the train brakes upon action of the train control units calling for such action. This valve is operated by a solenoid on which the circuit is normally kept closed.

The action of the control system to prevent interference with the movement of a train in a block in cases where the blocks in advance are clear or unoccupied, is as follows:—

As the train approaches the contact rail the stop slot on the tape opens the circuit on the contact pin 151, Figure 22, causing its current to be cut off, the circuit 151', thereby, deenergizing both the primary and secondary relays, marked P and S in Figure 21. Upon the train reaching the contact rail the contact shoe making contact with said contact rail and by reason of the block ahead being unoccupied electrical connection is established between the contact rail and the traffic rail. Therefore, the current on the contact shoe passing to the contact rail is conveyed to the traffic rails of the track to the engine ground, from the engine ground by wire 179, Figure 21, to the impulse relay magnets 189, causing said magnets to attract the armature 190, thereby closing the circuit between the contacts 191ª and 191ᵇ by means of a contact strip 191, causing the current to flow from the negative pole to the battery directly to the secondary relay by means of line 175. Thereby resetting the secondary relay and closing the stop valve circuit between the contacts 186' and 188'. After the train has passed a short distance beyond the contact rail the stop slot ends in the tape and the circuit on the contact pin 151, Figure 22, is reestablished by means of a line 151' on the primary relay, causing it to be reset opening the circuit on the stop valve it had maintained. Thus it will be seen that under such conditions the circuit of the stop valve is not open and the movement of the train is not interferred with

*Method of operation for automatic stoppage of train.*

The following actions take place under conditions which call for an automatic stop application of the train brake. Such conditions being for instance, a block in advance being occupied, a broken rail, or failure of source of power of the track circuit. As the train approaches the location of a contact rail, said contact rail is placed at the location of roadside signals. A slot on the metallic tape is brought by the movement of the train to come under the contact pin 151, Figure 22, thus cutting off the source of energy from the tape on this contact pin, thereby opening the circuit on the primary control relay P in Figure 21. This also opens the circuit on the secondary relay marked S in Figure 21. In this position the stop valve 106, Figure 22, receives its current from contacts 187 and 188 on the primary relay P, Figure 21. As the train proceeds it finally reaches the contact rail at the signal location, the contact shoe 140, making contact with the contact rail at this point. Under the conditions now being described it is taken that the block in advance is occupied, therefore, no electrical connection is made between the contact rail and the traffic rail. Therefore, no circuit on the impulse relay 189, Figure 21, is completed. The impulse relay armature 190 remains open. Thus no current is supplied through the secondary relay by the impulse relay. After the train has passed the contact rail for a short distance, the stop control slot on the tape will end. This will re-establish the current on the contact pin 151, Figure 22. Therefore by means of a line 151' the primary relay is re-energized, causing its plunger 185 to be attracted, thereby opening the stop control circuit between the contact pins 187 and 188, thus reducing the brake line pressure and causing the train brakes to be applied. The stop valve 106, Figure 22, will remain open until the secondary relay S in Figure 21 is reset.

The circuit during the foregoing operation is as follows:—

Current leaving the battery by line 161 passes around 172 to the terminal of the primary control relay 172', branching to terminal 172" of the secondary relay, thence grounded by line 173', to the casing of both the primary and secondary relays, passing through the primary relay winding, it leaves at line 151' to the contact 151 thence by the tape 72 to the reel ground, thence by the line 155 to the battery. Two branches are taken from line 151', the first one being line 174' to the contact 181', thence by contact 181" by line 174 it passes to the contact 193b, from the contact 193a to the contact 193a, thence by the line 175b to the terminal 175a, by the line 175 to the contact 191b. By the contact 191 to the contact 191a, thus by the line 177 to the line 155. By the line 155 it returns to the battery, thus completing this circuit. The second branch is taken at line 176 to the contact 193', thence by the contact 193" it is possible for a short circuit on line 161, allowing the branch 172' to the contact 172" thence through the winding of the secondary relay to the contact 175a, thence by the line 175 to the line 159, by the line 159 to the signal instrument ground contact of the signal carrying wheel. Thence from the engine ground back to the battery, completing this circuit. The stop valve circuit beginning at the battery takes line 61 to the line 172, thence by the ground of the casing of the primary relay to the primary solenoid core 186, to the contact of the solenoid core 187 to the contact 188, to the line 153, to the stop magnet 106, through the winding of the stop magnet to the wire 154, to the ground of the tape reel 64, through the tape 72, through to the ground of the tape reel 63, thence by wire 155 to the battery, completing this circuit. A branch of this line is made to the secondary relay by means of a ground of the secondary relay solenoid casing to the core of the solenoid by the core to the contact 187' to the contact 188', to the line 153', by the line 153' to the stop solenoid through the winding of the stop solenoid by the line 154 to the ground of the tape reel 64, by the tape to the ground of the tape reel 63 by the line 165 to the battery, completing this circuit.

For indicating a switching signal when the system functions to indicate to the engineer a switch signal the circuit is as follows:—

The current leaving the battery 155' by line 161 passes to line 162, through the light 15 to line 150' to the contact 150, through the tape to the ground on the tape reel 63, by the line 155 returning to the battery, branching off the line 162, the current passes through the light 17 by the wire 160 to the line 159, by the line 159 to the line 175, by means of the contact 191b to the contact 191, hence by contact 191a to the line 177, thus by line 178 to the line 155 by line 155 returning to the battery, completing this circuit.

*For indicating a caution signal.*

Whenever it is desired to give a caution signal to the engineer to call his particular attention to some hazardous condition of the roadway, slots are cut in the tape to occur at a sufficient distance in advance of the condition of which he is warned to give him time to take the proper precautions to safeguard his train against the conditions of which he is being warned. These slots are operative on the contact pin 148, Figure 22. When the train approaches one of these cautionary locations, the caution slot coming under the contact 148 opens the circuit on the signal instrument solenoid by line 148' thereby de-energizing the upper half of the solenoid 33. This causes the core 36, Figure 5, to center on the lower half of the solenoid, thereby swinging the signal supporting wheel in position to bring the caution signal glass before the panel 23a. This will give a visible indication of caution to the engineer, at the same time the wheel contacts with the upper audible signal contact 53. As the signal wheel is grounded current is supplied through the contact on the signal wheel to the contact 53 thence by wire 159 to wire 158 to the terminal 157, of the whistle operating solenoid, thereby causing the whistle to blow, giving the engineer an audible signal to attract his attention to this change of signals on the signal instrument. The circuit provided for the foregoing function is as follows:—

The current for this circuit leaving the battery at 161, passes by line 172 through either the primary or secondary relays to the line 153, to the line 152, to the central terminal of the signal instrument solenoid 33. Through the upper core or part of this solenoid to the line 148' hence by this line to the contact number 148, hence through the tape 72 to the ground on the reel 63 by line 155, to the battery, completing this circuit. Upon a caution slot in the tape coming under this contact 148, the previously described circuit is open causing all the current on the solenoid to flow through the lower half of it, thus causing the signal supporting wheel core to center on the lower half of the solenoid, thus bringing the cautionary signal before the panel 23ᵃ, at the same time closing the following traced circuit on the whistle operation solenoid number 29. The current leaving the battery at line 161 passes by line 163 to the whistle operating solenoid 29, through the winding of this solenoid by the line 158, by line 159 to the upper stationary contact 53 of the signal instrument, by the aforementioned turning of the signal supporting wheel to bring the caution signal before the panel 23ᵃ, the signal supporting wheel contact 54 is caused to make contact with this upper stationary contact 53, thus by reason of the grounding of the signal instrument, the current flows from the signal instrument back to the battery, completing this circuit.

In the case of speed control, the following action takes place:

At a sufficient distance in advance of the conditions where speed control is desired, slots are cut in the tape to occur under the contact 149, Figure 22. The following action takes place: When the speed control slot occurs under the contact pin 149 the current is cut off the line 149′, de-energizing the magnet 165′, causing the armature 165ᵃ to drop away from the magnet core thereby closing the circuit between the armature and the contact 156. Thus supplying the negative current direct from the battery, by means of the line 156′ to the audible signal and to the speed control signal light and to the speed control indicating instrument. If the speed control contact needle is making contact with the beginning of the circuit with line 164ᵃ, current is supplied to the speed control shorting magnet 104′, attracting the armature of this magnet thereby through the means of line 170 and line 171 shunting the current upon the stop magnet, causing the stop valve to open and resulting in the application of the train brakes. This needle is controlled by a small generator driven from the pony truck axle and its position is always relative to the speed at which the train is traveling. The contact on the speed indicating instrument of line 164ᵃ can be arranged so that the needle will make contact with it at any predetermined speed. When the speed of the train is such that the needle does not make contact with the contact line 164ᵃ, the shunting magnet 104′ is not energized, therefore, no action is made upon the stop magnet of the stop valve. Thus is it seen that when the train control action regarding the controlling of the speed of the train at any given predetermined rate is in effect, no action is made upon the train brakes so long as the speed at which the train travels during its effectiveness is below the predetermined rate. However, in case the speed of the train should exceed the predetermined rate the brakes are applied by the previously described manner of action. The circuit is as follows:—

Current leaving the battery at line 161 passes by line 164 to line 165, entering speed control relay 165′, passing through this winding and leaving by line 149′, to the contact 149, passing through the tape 72 to the ground of the reel 63, thence by the line 155 to the battery, thus completing this circuit. Also as a part of this operation, the current leaving the battery at line 161, passes by line 164 to the shunting magnet 164′, passing through this winding and leaving by line 164ᵃ to the stationary contact of the signal instrument, at the termination of the line 164ᵃ. When the movable contact or finger of the speed indicator makes contact with the stationary contact of same the current passes by line 157 to the line 156 to the armature 165ᵃ of the speed control relay magnet 165′, providing this armature is in the open or released position, it passes through the armature to the line 156′, by the stationary contact thereon to the line 155, thence to the battery, thus completing this circuit. At the same time the whistle operating circuit is completed as follows:— Current leaving the battery at line 161 passes by line 163 to the whistle operating solenoid 29, thence by line 157 passes to line 156, through the armature 165ᵃ providing that it is in the release position, to the line 156′, thence by line 155 to the battery, completing the whistle operating circuit, thereby causing an audible signal to be given. Also when the movable indicating finger of the speed indicator is making contact with the stationary contact of the indicator current passes from the battery by line 161, to the line 164, to the shunting magnet 164′, through this winding to the line 164ᵃ, through the speed indicator contact to the line 157, by line 156 to the armature 165ᵃ, through the armature providing it is in the release position, to the line 156′, thence by the line 165 to the battery, completing the circuit. This causes the energization of the shunting magnet attracting its armature, thereby causing a shunt upon the stop magnet between the lines 170 and 171, thereby causing the stop magnet to be de-energized, thus opening the stop valve and applying the train brakes.

In the operation of the automatic stop control unit of this system the following methods of operation are brought into play to give the engineer visible and audible signals to advise him of the automatic stop functioning.

Whenever a stop application of the brakes is to be made the current upon the signal instrument solenoid 33 is cut off by the control relays by means of line 163, thus de-energizing the signal instrument solenoid as a result causing the signal glass supporting wheel 37 to be turned by the weight 58 so as to bring the signal 44ª which indicates danger before the panel 23ª. At the same time causing the whistle operating contact 54, mounted on the signal supporting wheel to come in contact with the lower whistle contact 53. Thereby by means of the line 159, Figure 22, closing the circuit to line 158 on the whistle operating solenoid 29, thereby resulting in the operation of the air whistle, thus giving both an audible and visible signal to the engineer to indicate that a danger condition for his train exists.

On the other hand whenever a contact rail is set to indicate or give a clear impulse to the train upon the closing of the relay armature 190, current is supplied by means of line 175 and 159 to the clear conditions indicating light 17 by wire 160 and current also being supplied by line 158 to the whistle operating solenoid 29, thus advising the engineer that a release impulse has been received from the contact rail at this particular place; thus giving him positive assurance that the block in advance is clear and that no action to stop his train automatically will be taken by the control apparatus.

Indications upon the signal board are given to indicate the approach to switches and means provided to indicate whether the switch being approached is open or closed in position. This is accomplished by the following means provided for same. Slots are cut in the tape to occur during the travel with the train at a sufficient distance in advance of each switch to give a proper interval of time between the occurrence of the signal and the actual reaching of the switch by the train. Contact rails are placed in advance of each switch so protected and so arranged that when the switch is in the closed position electrical contact is established between the contact rail and the track rail and that when the switch is open no electrical contact will exist between the contact rail and the traffic rail.

Normally the light 15, Figure 22, is lighted. At the approach of a switch the switch indicating slot in the tape cuts off the current on the contact 150, thereby extinguishing the light, indicating to the engineer the approach of the train to a siding. In case the switch is closed upon the contact shoe establishing contact with the contact rail current passes from the contact shoe to the contact rail, hence by means of the connection between the contact rail and the traffic rail, it passes to the traffic rail, from the traffic rail to the engine ground, from the engine ground to the impulse magnet 189, thereby energizing same causing its armature to be attracted, thus closing the circuit between contacts 191ª and 191ᵇ, thereby closing the circuit by means of line 159 on the light 17, thus indicating to the engineer that the position of the switch being approached is closed. On the other hand in case the switch is open, no connection is made between the contact rail and the traffic rail, hence no current passes from the contact shoe to the engine ground, thus the impulse relay is not energized and the circuit on the light 17 remains open. This indicates to the engineer that the switch he is approaching is in the open position.

Whenever the switch being approached is in the closed position upon the closing of the impulse relay current is supplied to light 17 also supplies the current to the whistle operating solenoid 29, causing the whistle to operate giving the engineer an audible signal in addition to the visible signal, indicating the clear or closed position of the switch.

In describing the mechanical operation involved in this system of control, I will first briefly outline the functioning of the principal part of which the system is composed.

To begin with a metallic tape is arranged upon wheels as shown in Figure 11, this tape being driven from a sprocket wheel 68 by perforation on each side of the tape in which the teeth of the sprocket wheel engages. The sprocket wheel being driven from an idler wheel which rides upon the face of one of the pony truck wheels of the locomotive, through the following driving arrangement.

Figure 16:
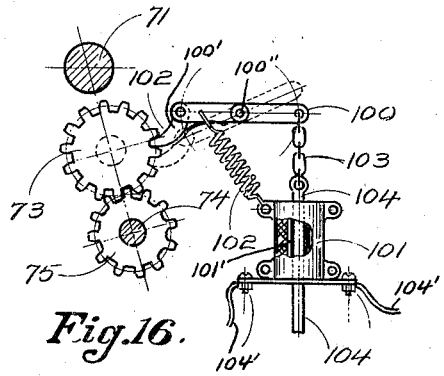
Figure 16 is a fragmentary view showing the tape retarding mechanism.
Figure 17:
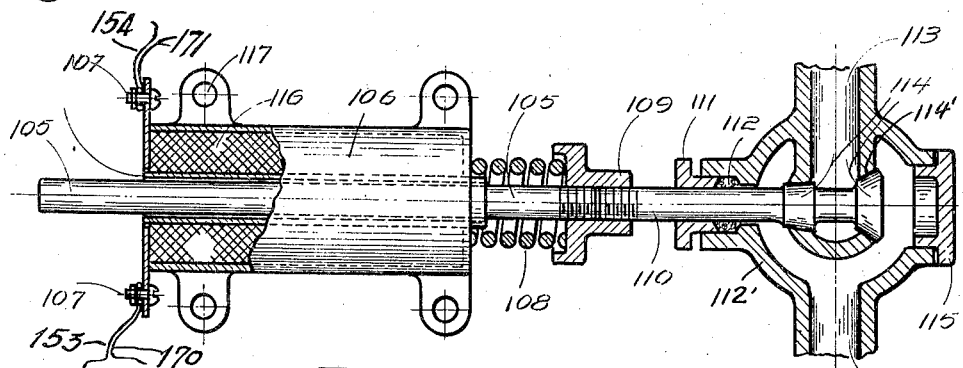
Figure 17 is a sectional view of an air brake element.

The sprocket wheel being mounted on the shaft 71, said shaft terminating in the worm gear 120. Said worm gear being driven by the worm 119' which is mounted on the shaft 119, which terminates in the bevel gear 121, said bevel gear being driven by the co-related bevel gear 122, mounted on the shaft 131. On this shaft 131 the idler wheel 124 is fastened. Said idler wheel riding on the face of the pony truck wheel as shown in Figure 26. Through this means on each revolution of the pony truck wheel, a given number of revolutions according to the differences in diameter between the two, will be made by the idler wheel 124, transmitted through the bevel gears 122 and 121 to the shaft 119, on which the worm 119' is mounted. Said worm driving the worm gear 120, thus transmitting the motion to the shaft 171, on which the sprocket gear 68 is mounted. Through this arrangement for a given distance travelled by the train a certain ratio of movement is transmitted to the metallic tape by the proper arrangements of the gear relation. Any given travel to the tape can be had, for illustration, for every mile the train travels four inches of tape movement can be had. In connection with the driving of the tape means is provided as shown in Figure 16 for retarding the tape whenever the train enters a siding at one end, and passes out at the opposite. Under such circumstances the train will travel as a general rule, a greater distance by way of the siding, than if it remained on the main line, therefore, this would cause a corresponding greater movement of the tape, which would naturally result in the tape being out of coordination with the track impulses located on the main line. The retarding of the tape is obtained in the following manner: On the shaft 71, there is a spiral keyway 89, a coordinating key connects this shaft with the sprocket wheel in such a manner that a longitudinal movement of the shaft in the sprocket wheel will cause its rotation. This principle being well known by its application in the commonly known "Yankee screw driver." Circular notches are cut in the shaft 71, as shown by 90, Figure 13, a screw so cut that it will engage in these notches in shaft 71, is shown at 91, Figure 13. Also gear teeth are cut in one end of this screw shown at 73 to engage in the gear 75, mounted on the shaft 74. On the turning of the shaft 74, thereby turning the gear 75, thus driving the gear 73, and the screw 91, thus transmitting a horizontal movement to the shaft 71, causing the sprocket wheel 77 to be retarded or turned back according to the amount of the movement of the shaft 71, thus providing for the retarding of the tape in switching and siding movements of the train. Means are also provided as shown in Figure 16 for the automatic retarding of the tape.

A pawl 100' is arranged to engage in the gear 73. This pawl is mounted on the arm 100 connected by the links 103 to the core 104 of the solenoid 101. The arm is pivoted at 100'' and held in position by the spring 74. The action of this unit is as follows:—

The solenoid is normally energized by receiving a current from a contact suitably placed to bear against the metallic tape not shown on the drawing, so arranged that each siding location slots will occur in the tape to open the circuit on this contact controlling the circuit of the retard solenoid 101. The action is that upon the slot in the tape opening the circuit on the solenoid, the de-energization of the solenoid thereby releases the core 104, which allows the spring 74 to pull the arm 100 down, thus by the pawl 100' turning the gear 73 a given amount, according to the travel arranged for this arm to make, as shown by the dotted lines in Figure 16. Upon the slot in the tape ending the circuit on the solenoid 101, is thereby reclosed, and the core is again attracted, thus pulling the arm 100 to its original normal position. It is therefore apparent that if each movement of this core turns up one notch of the gear producing a retard on the tape equivalent to the travel of ten feet of the train, when it is desired to make a retard for forty feet of extra travel of the train that by providing four slots in the tape to occur successively for retarding operation, the forty feet retard can be effected.

It is thought that the many advantages of a train control system in accordance with this invention can be readily understood, and although the preferred embodiment of the invention is as illustrated and described, but it is to be understood that changes in the details of construction and arrangement can be had which will fall within the scope of the invention as claimed.

What is claimed is:—

1. A train control system, comprising apparatus located in the cab of the train locomotive, and electrically coupled to circuits established through the tracks with which the train contacts, said circuits including a train driven conducting tape, relays, and a control mechanism in the cab in turn acted upon by electrically coupled circuits responsive to the currents flowing through the train driven conducting tape.

2. A train control system, comprising apparatus located in the cab of the train locomotive, and electrically coupled to circuits established through the tracks with which the train contacts, said circuits including a train driven conducting tape, relays, and a control mechanism in the cab in turn acted upon by electrically coupled circuits responsive to the currents flowing through the train driven conducting tape, the train controlled circuits being normally in closed circuit condition, and means for breaking said closed circuit to cause responsive action on the part of the train controlled mechanism.

3. A train control system comprising an apparatus located in the cab of the train locomotive, a train driven conducting tape on the locomotive, sprocket pins for driving the tape and operating to close an electric circuit while actuating the tape, and audible and visible signals responsive to the sprocket pins, and also train controlled means responsive to the sprocket pins.

4. A train control system comprising an apparatus located in the cab of the train locomotive, a train driven conducting tape on the locomotive, sprocket pins for driving the tape and operating to close an electric circuit while actuating the tape, and audible and visible signals responsive to the sprocket pins, and also train controlling means responsive to the sprocket pins, the tape having perforations to be entered by the pins and thereby cause interruptions of the circuit.

5. A train control system comprising an apparatus located in the cab of the train locomotive, a train driven conducting tape on the locomotive, sprocket pins for driving the tape and operating to close an electric circuit while actuating the tape, and audible and visible signals responsive to the sprocket pins, and also train controlling means responsive to the sprocket pins, the tape having perforations to be entered by the pins and thereby cause interruptions of the circuit, and said perforations occurring on both sides of the line of travel of the tape.

6. A train control system, comprising an apparatus located in the cab of the train locomotive, and including a metallic tape with means for driving it from a pony truck wheel on the train locomotive, said tape being of a conducting nature and perforated on opposite sides of its line of travel, propelling pins for the tape adapted to enter the perforations to thereby break the circuit, and retarding means for extending the travel of the tape to compensate for the extra travel of the tape when the train enters the siding.

7. A train control system comprising apparatus located in the cab of the train locomotive and electrically coupled to circuits established through the tracks with which the train contacts and including a mechanically driven conductor and a control mechanism in the cab, in turn acted upon by electrially coupled circuits responsive to currents flowing through the mechanically driven conductor.

8. A train control system comprising control apparatus located in the cab of the train locomotive and electrically coupled to electric circuits established through the tracks with which the train contacts, said circuits including a train carried and driven conducting tape and control mechanism in the train cab in turn acted upon by electrically coupled circuits responsive to currents flowing through the tape.

9. A train control system comprising control apparatus located in the cab of the train locomotive and electrically coupled to electric circuits established through the tracks with which the train contacts, said circuits including a train carried and driven conducting tape and control mechanism in the train cab in turn acted upon by electrically coupled circuits responsive to currents flowing through the tape, the train controlled circuit being normally in closed circuit condition.

10. A train control system comprising control apparatus located in the cab of the train locomotive and electrically coupled to electric circuits established through the tracks with which the train contacts, said circuits including a train carried and driven conducting tape and control mechanism in the train cab in turn acted upon by electrically coupled circuits responsive to currents flowing through the tape, the train controlled circuit being normally is closed circuit condition and provided with means for periodically interrupting the closed circuit conditions.

11. A train control system comprising control apparatus located in the cab of the train locomotive and electrically coupled to electric circuits established through the tracks with which the train contacts, said circuits including a train carried and driven conducting tape and control mechanism in the train cab in turn acted upon by electrically coupled circuits responsive to currents flowing through the tape, the train controlled circuit being normally in closed circuit condition and provided with means for periodically interrupting the closed circuit conditions, said interruptions occurring on both sides of the line of travel.

12. A train control system comprising control apparatus located in the cab of the train locomotive and electrically coupled to electric circuits established through the tracks with which the train contacts, said circuits including a train carried and driven conducting tape and control mechanism in the train cab in turn acted upon by electrically coupled circuits responsive to currents flowing through the tape, the train controlling circuit being normally in closed circuit condition and provided with means for periodically interrupting the closed circuit conditions, said interruptions occuring on both sides of the line of travel, and said tape propelling means being provided with retarding means for extending the length of travel of the tape when entering a siding.

In testimony whereof, I affix my signature hereto.

FLOYD B. MERRILL.